(12) United States Patent
Tamura

(10) Patent No.: US 8,243,333 B2
(45) Date of Patent: Aug. 14, 2012

(54) IMAGE PROCESSING APPARATUS, IMAGE PROCESSING METHOD AND COMPUTER PROGRAM

(75) Inventor: Hirokazu Tamura, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 506 days.

(21) Appl. No.: 12/277,500

(22) Filed: Nov. 25, 2008

(65) Prior Publication Data

US 2009/0161124 A1 Jun. 25, 2009

(30) Foreign Application Priority Data

Dec. 20, 2007 (JP) ................... 2007-329341

(51) Int. Cl.
G06K 15/00 (2006.01)
G06K 9/40 (2006.01)

(52) U.S. Cl. ..................... 358/2.1; 382/274; 382/275

(58) Field of Classification Search .................. 358/2.1, 358/1.9, 3.26, 462, 3.27, 426, 1.18, 471, 358/474, 464; 382/275, 274
See application file for complete search history.

(56) References Cited

U.S. PATENT DOCUMENTS

| 5,715,382 A * | 2/1998 | Herregods et al. | 358/1.18 |
| 7,064,863 B2 * | 6/2006 | Fukuda et al. | 358/1.9 |
| 7,209,599 B2 * | 4/2007 | Simske et al. | 382/275 |

FOREIGN PATENT DOCUMENTS

| JP | 5-63968 | 3/1993 |
| JP | 8-265563 | 10/1996 |
| JP | 10-257325 | 9/1998 |
| JP | 2002-152473 | 5/2002 |
| JP | 2003-338930 | 11/2003 |

* cited by examiner

*Primary Examiner* — Charlotte M Baker
(74) *Attorney, Agent, or Firm* — Fitzpatrick, Cella, Harper & Scinto

(57) ABSTRACT

A problem of the present invention is to prevent showthrough of a rear side image to a front side image without using any complicated processing at a time of reading out both sides of a document. To solve the problem, an image processing apparatus in accordance with the present invention reads out image information on the front side and rear side of a document; calculates a first background level from the image information on the front side; calculates a second background level by adjusting the first background level according to the first background level calculated and the density of the image information on the rear side; and removes the background of the front side using the second background level.

9 Claims, 9 Drawing Sheets $$R' = R + f_R(R, G, B)$$
$$G' = G + f_G(R, G, B)$$
$$B' = B + f_B(R, G, B)$$
$$f_R(R, G, B) = \frac{(255 - R_w)}{R_w \times G_w \times B_w} \times R \times G \times B$$
$$f_G(R, G, B) = \frac{(255 - G_w)}{R_w \times G_w \times B_w} \times R \times G \times B$$
$$f_B(R, G, B) = \frac{(255 - B_w)}{R_w \times G_w \times B_w} \times R \times G \times B$$

EXPRESSION 1

$$R_w' = R_w + g_R(x, y)$$
$$G_w' = G_w + g_G(x, y)$$
$$B_w' = B_w + g_B(x, y)$$

EXPRESSION 2

$$R_{coef(n)} = \frac{(255 - R_{w(n)})}{R_{w(n)} \times G_{w(n)} \times B_{w(n)}}$$
$$G_{coef(n)} = \frac{(255 - G_{w(n)})}{R_{w(n)} \times G_{w(n)} \times B_{w(n)}}$$
$$B_{coef(n)} = \frac{(255 - B_{w(n)})}{R_{w(n)} \times G_{w(n)} \times B_{w(n)}}$$

EXPRESSION 3

IMAGE PROCESSING APPARATUS, IMAGE PROCESSING METHOD AND COMPUTER PROGRAM

BACKGROUND OF THE INVENTION

1. Field of the Invention

The present invention relates to an image processing apparatus, image processing method and computer program, which read images on both sides of a document and prevent showthrough in which the printing on the rear side is visible through the paper.

2. Description of the Related Art

Conventionally, an image reader, typified by a scanner, fax machine, and copying machine can automatically acquire an front side image and a rear side image of a document using an ADF (Auto Document Feeder) and the like at the time when reading out the images from a document. Thus, a user need not place the document printed on both sides on a document glass twice, the front side and the rear side each, so that the load of acquiring the document printed on both sides is reduced. In addition, recently, it has become possible to acquire the front side image and rear side image of a document simultaneously through a seeming single reading operation by preparing two image sensors for reading the front side and rear side each within a single reader.

However, when the conventional image reader reads a document printed on both sides, the rear side image sometimes appears in the front side image depending on the thickness of the document paper or on the amount of light to the image sensors. This constitutes a primary factor of deteriorating the quality of the images read.

Conventionally, various trials have been made concerning the showthrough image problem of the document. For example, such processing is typical that eliminates the rear side image effect from the front side image by subtracting a mirror image of the rear side image from the front side image.

According to Japanese Patent Laid-Open No. H08-265563 (1996), the showthrough is reduced by the processing that eliminates the effect of the rear side image on the front side image by the addition of the front side image and the rear side image.

According to Japanese Patent Laid-Open No. H05-063968 (1993), it determines the background level of a document by prescanning, and eliminates the pixels with the luminance higher than the calculated background level efficiently. In this case, although a contrivance to prevent deterioration in the document color reproducibility is made using formulae, since it does not consider the unexpected appearance of the rear side image, it cannot eliminate the showthrough from the document background having a lot of showthrough.

However, to achieve the foregoing combining processing, the alignment accuracy between the front side image and rear side image of the document is very important. For example, if the registration position between the two sides, that is, the coordinate position of the rear side image corresponding to that of the front side image shifts by 200 μm, this corresponds to a shear of five pixels in the image read at a resolution of 600 dpi. When carrying out subtracting combining of the document with the shear of five pixels, the subtracting combining can sometimes reduce the alignment accuracy on the contrary. Thus, it is essential for the reading device to increase its registration accuracy. When the alignment accuracy is low, showthrough shadows appear as a result of the subtracting combining made on locations where no rear side image appears.

Furthermore, it requires the size of a subtracting combining circuit whose input is two sheets of images, the processing cost and a memory, and these factors present another problem besides the cost for increasing the accuracy of the reading device.

SUMMARY OF THE INVENTION

To solve the foregoing problems, the image processing apparatus in accordance with the present invention comprises: front reading unit for reading image information on the front side of a document; rear reading unit for reading image information on the rear side of the document; computing unit for calculating a first background level from the image information on the front side read out by the front reading unit; computing unit for calculating a second background level by adjusting the first background level according to the first background level calculated by the computing unit and according to a density of the image information on the rear side read out by the rear reading unit; and background removal unit for removing background of the image on the front side by using the second background level calculated by the computing unit.

According to the present invention, the showthrough, in which the rear side image appears in the front side image, can be removed by carrying out the background removal processing of the front side image while considering the density of the rear side image.

Further features of the present invention will become apparent from the following description of exemplary embodiments (with reference to the attached drawings).

BRIEF DESCRIPTION OF THE DRAWINGS

FIG. 9 is a diagram showing formulae of background removal of the present embodiment.

DESCRIPTION OF THE EMBODIMENTS

The invention will now be described in detail with reference to the accompanying drawings.

Embodiment 1

As a means for electronically reading information on a document on which the information is written, an image reader such as a copying machine, a fax machine and a scanner for computer input is used.

In addition, as an automatic double-side reader that automatically reads image information on the document, a front side image and a rear side image, without the intervention of the user, a method of reading the document by reversing the two sides thereof through an inverting section is installed and put to practical use most widely.

Figure 2:
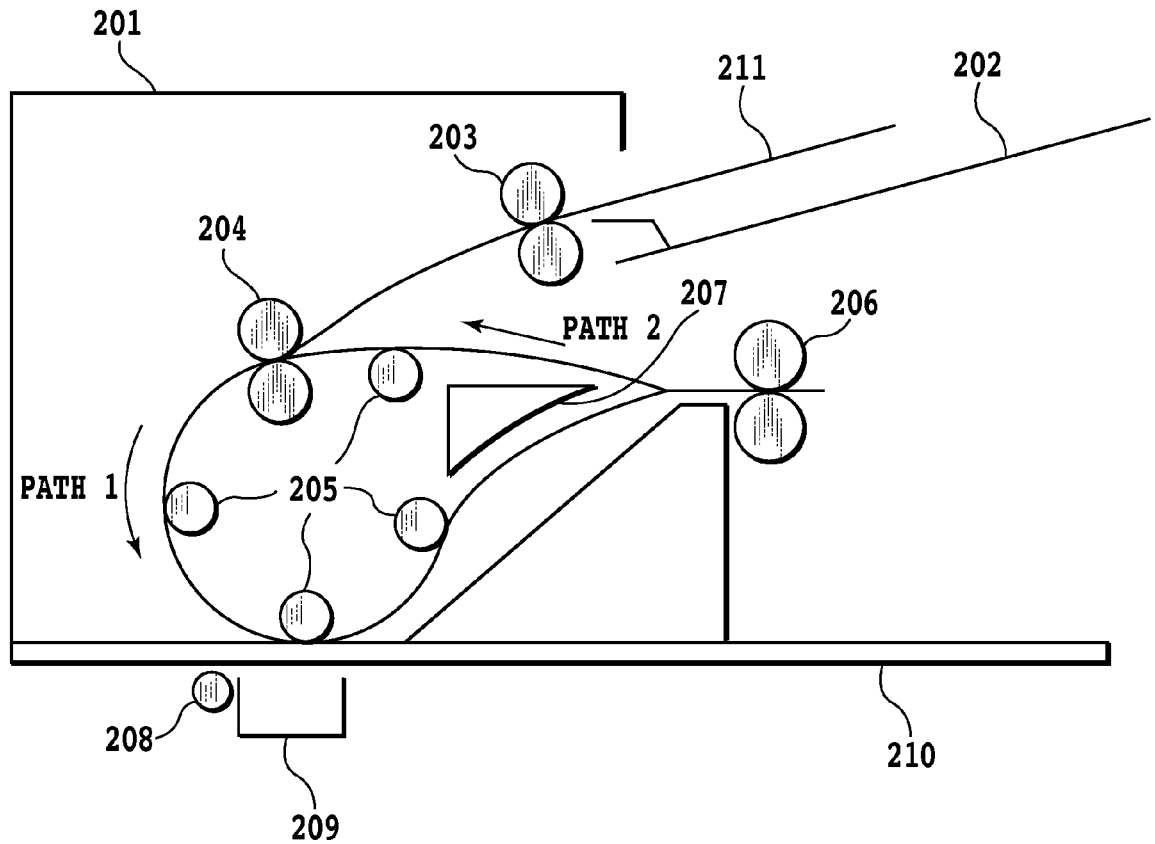
FIG. 2 is a diagram showing an automatic double-side reader of the present embodiment.

The automatic double-side reader employing such a document inverting section is denoted by the reference numeral 201 in FIG. 2.

In the present specification, unless otherwise specified, the description is made under the assumption that a color document is read in the form of color image data.

FIG. 2 shows a document tray 202, pickup rollers 203, conveyor rollers 204, rollers 205, rear side conveyor/paper output rollers 206, a separating nail 207, a light source 208, a reading section 209, a document glass 210, and a document 211.

Documents 211 stacked on the automatic double-side reader 201 are sent to a reading path one by one by the pickup rollers 203. The document sent to the reading path one by one through the pickup rollers 203 is carried in the direction of a path 1 shown in FIG. 2 through the conveyor rollers 204. The reading section 209 is juxtaposed with the light source 208. The light source 208 has spectral intensity in a wavelength region of the visible light region. The document arriving at the reading position through the path 1 is irradiated by the light source 208, and the light reflected off the document enters the reading section 209. The reading section 209, which has at least a photoelectric converter, stores charges in accordance with the intensity of the incident light, and converts them into digital data through an A/D converter not shown, thereby converting the image information on the document to digital image data. Here, the intensity of light entering the reading section 209 depends on the distribution of the spectral reflectance included in the information on the document.

As for the document 211 arriving at the reading position through the path 1, the light source 208 and the reading section 209 read the image information written on the surface.

After that, the document 211 reaches the rear side conveyor/paper output rollers 206 and is ejected once as far as the rear end of the document. After that, the rear side conveyor/paper output rollers 206 rear side their rotation so as to introduce the document 211 into the automatic double-side reader 201, again. The document 211 is guided by the separating nail 207 toward the path 2 and is passed through the path 1 by the conveyor rollers 204, again, so that the image information written on the rear side of the document 211 is read at the document read position by the light source 208 and the reading section 209. Subsequently, the rear side conveyor/paper output rollers 206 eject the document 211.

Repeating the foregoing operation enables the pieces of the image information on the front side images and rear side images of a group of the documents stacked on the document tray 202 to be read sequentially.

When the automatic double-side reader reads the image information written on both sides of the documents in this way, it can automatically read the front side images and rear side images of the documents without the intervention of the user. In addition, the automatic double-side reader reads the images on both sides with the single light source and reading section, and its optical system is also single. Accordingly, the automatic double-side reader has the same geometrical characteristics and hue characteristics about the read images on both sides. On the other hand, the automatic double-side reader takes a lot of time to read the images because it conveys the document within itself each time it reads the front side image and the rear side image. In addition, since the document conveyance of the automatic double-side reader is complicated, the probability of a jam increases.

Figure 3:
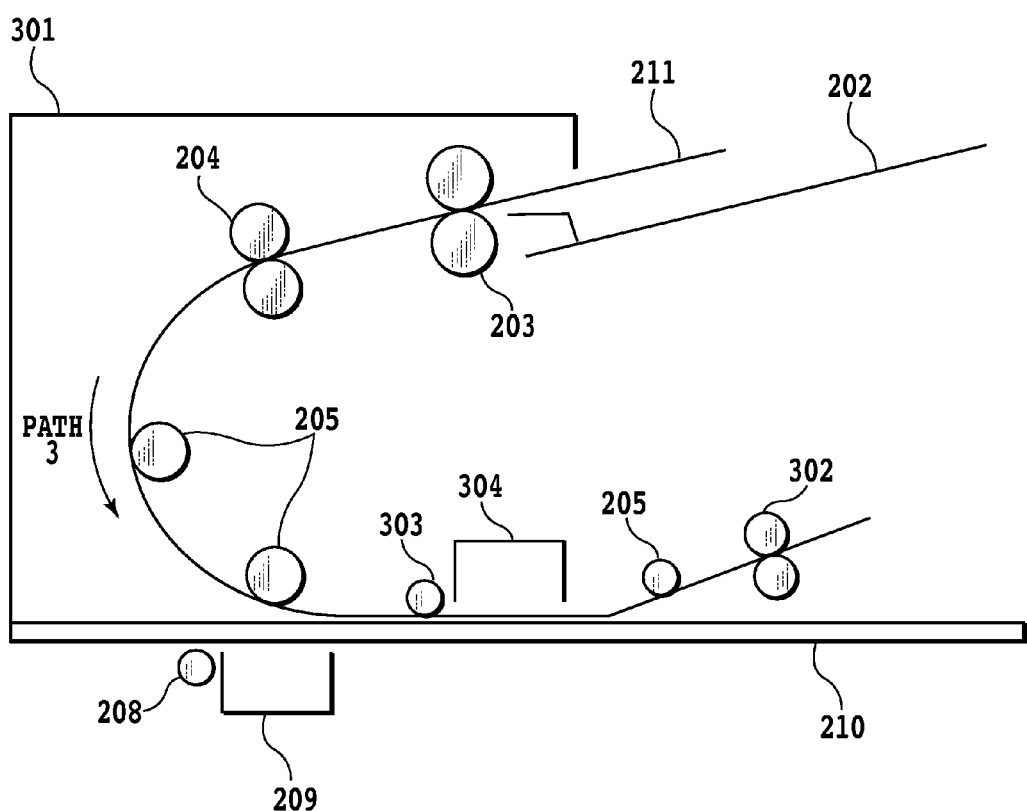
FIG. 3 is a diagram showing a simultaneous double-side reader of the present embodiment.

In contrast with this, a simultaneous double-side reader that simultaneously reads the front side image and rear side image of a document having information written on its front side and rear side during a single conveyance is indicated by the reference numeral 301 of FIG. 3.

FIG. 3 shows paper output rollers 302, a light source B (303), and a reading section B (304), with the remaining components having the same functions as those of the automatic double-side reader and being designated by the same reference numerals as those of FIG. 2.

The documents 211 stacked on the document tray 202 are sent to the reading path one by one by the pickup rollers 203. The picked up document 211 is conveyed toward a path 3 through the conveyor rollers 204. The document 211 arrives at the reading position through the path 3 so that the light source 208 and the reading section 209 read the image information written on the front side of the document 211. After that, when the document 211 arrives at the reading position of the reading section B (304), the light source B (303) and the reading section B (304) read the image information on the rear side of the document 211. After that, the document 211 is ejected by the paper output rollers 302.

Repeating the foregoing operation enables the pieces of the image information on the front side images and rear side images of a group of the documents stacked on the document tray 202 to be read through a single conveyance each.

When the simultaneous double-side reader reads the image information written on both sides of the documents in this way, it can automatically read the front side images and rear side images of the documents without the intervention of the user. In addition, the simultaneous double-side reader can read the information on the front side image and rear side image of each document simultaneously through a single conveyance. Accordingly, the simultaneous double-side reader can shorten the time necessary for reading the images, thereby being able to improve the performance as a reading apparatus. Furthermore, the simultaneous double-side reader can reduce the probability of a jam because it has to have only one path for conveying the documents. In addition, the simultaneous double-side reader has the image reading devices for the front side reading and the rear side reading such as the light source 208 and light source B (303) and the reading section 209 and reading section B (304), respectively.

In the following, the combination of the light source 208 and reading section 209 will be referred to as a reading device A, and the combination of the light source B (303) and reading section B (304) will be referred to as a reading device B.

For example, the reading device A is placed under the document glass 210, and hence when the document 211 is put on the document glass 210, the reading device A can read it while moving in the subscanning direction of the document.

Using the foregoing reading apparatus makes it possible to acquire the information on both the front side image and rear side image printed on the both sides of the document.

The front side image and rear side image of the document are temporarily spooled in a storage medium like an HDD after passing through image processing such as γ correction or spatial filtering when they are read out. After that, having undergone image processing, they are printed out from the printer or transmitted to a network.

Figure 1:
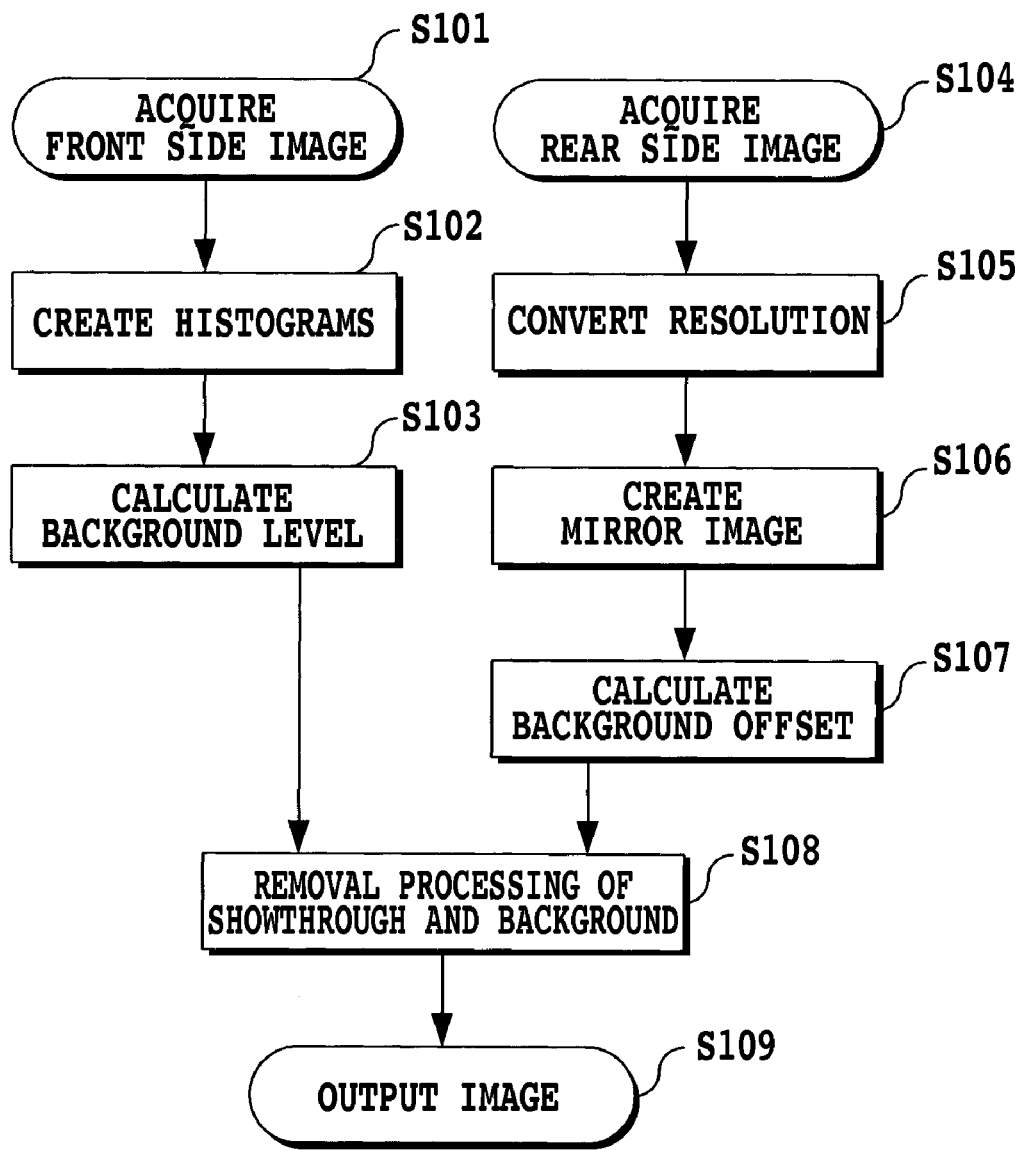
FIG. 1 is a flowchart for explaining processing flow of the present embodiment.

FIG. 1 shows a processing flow in the present embodiment.

At step S101, the reading apparatus acquires the image information on the front side of the document. At step S102, according to the image information on the front side of the document acquired by the reading apparatus at step S101, the CPU of the reading apparatus not shown creates a histogram for each of RGB. Subsequently, at step S103, the CPU of the reading apparatus not shown searches for a pixel value with a high frequency of occurrence (peak position) from the histograms created at step S102, and calculates the pixel value as a background level (first background level). Subsequently, at step S104, the reading apparatus acquires the image information on the rear side of the document. Subsequently, at step S105, the CPU of the reading apparatus not shown converts the resolution of the rear side image information acquired at step S104. For example, the CPU of the reading apparatus not shown converts the resolution of the rear side image information acquired at step S104 to a resolution of about 1/10. For example, it reduces the resolution by averaging a plurality of pixels.

Subsequently, at step S106, the CPU of the reading apparatus not shown creates the mirror image of the resolution-reduced rear side image in the main scanning direction. At step S107, according to the rear side image information, the CPU determines the extent to which the rear side image at a particular position exerts an effect on the front side image. For example, the CPU of the reading apparatus not shown can make a decision that the degree of showthrough to the front side image is high at locations where the rear side image is thick (where the luminance is low). On the contrary, the CPU of the reading apparatus not shown can make a decision that the degree of showthrough to the front side image is low at locations where the rear side image is thin. At step S107, the CPU calculates the amount of offset of the background from the density of the rear side image. As for the calculation of the amount of offset of the background, it will be described later.

According to the amount of offset of the background calculated at step S107 and the background level of the front side image calculated at step S103, the CPU of the reading apparatus not shown removes the background of the front side image at step S108.

Next, the histograms created at step S102 and the background level calculated at step S103 will be described in detail with reference to FIG. 4.

Figure 4:
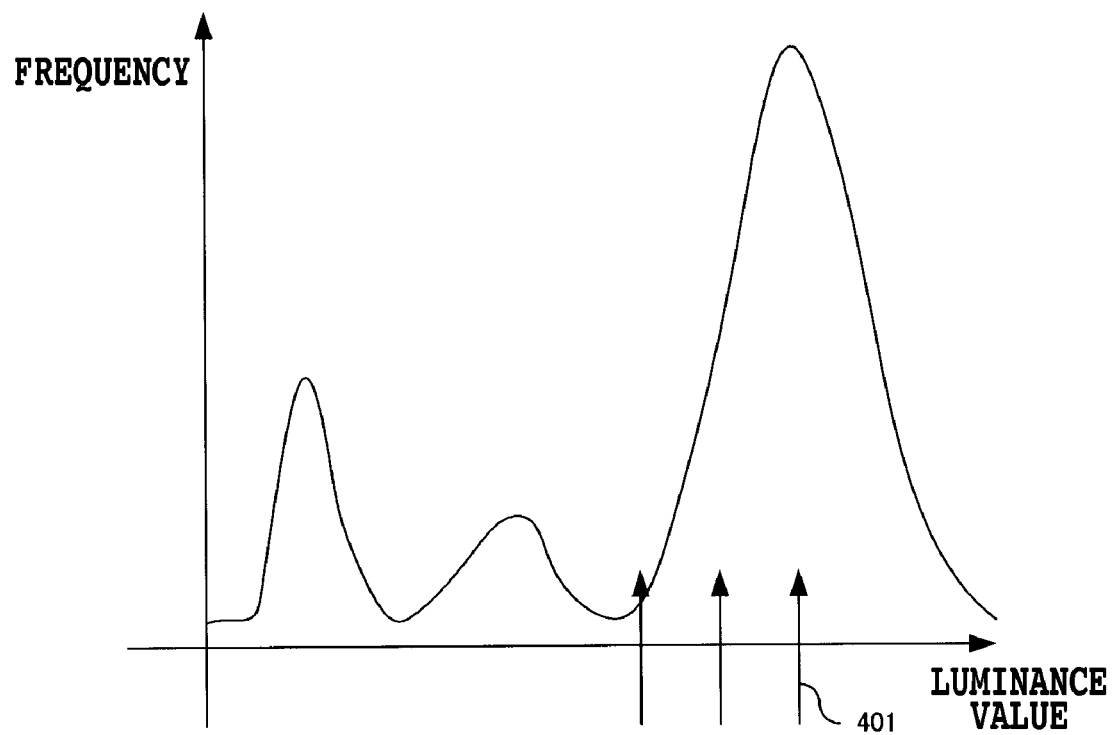
FIG. 4 is a diagram showing an example of a histogram of the present embodiment.

FIG. 4 shows a histogram about the frequency of occurrence of luminance values of an image. In the histogram, the position with the highest frequency of occurrence (401) can be used as the background level. When the document image has the background level, it is preferable that background regions be reproduced at the same level in the output. As for an image with 8 bits/sample for each of RGB in the background regions in the image, the background removal of the document can be carried out by replacing to R=G=B=255. The calculation of the background removal of the present embodiment will be described concretely in the following. As will be described below, the background removal is performed only when the background level is in a predetermined range.

At step S102, the CPU creates the histogram for each of the RGB, and calculates the background level ($R_W$, $G_W$, $B_W$) at step S103. According to the background level ($R_W$, $G_W$, $B_W$) thus calculated, the CPU executes the calculation of Expression 1 of FIG. 9 in accordance with the input pixel values (R, G, B) of the front side image acquired at step S101 to obtain the output pixel values (R', G', B'). Accordingly, the output pixel values (R', G', B') are pixel values after the background removal processing.

In Expression 1, $f_R$ (R, G, B), $f_G$ (R, G, B) and $f_B$ (R, G, B) are offset values of the R component, G component and B component, respectively. When the input pixels have levels higher than the background level, the offset values are great. On the other hand, when the input pixels have levels lower than the background level, the offset values are small. In addition, when the differences between R, G and B are great (pixels with high saturation), the offset values are also small, thereby being able to maintain the color reproducibility of the original.

The output pixel values (R', G', B') thus obtained are converted to values close to R'=G'=B'=255 about colors whose input pixel values (R, G, B) are around the background level. In addition, as for colors with high saturation, their original colors are maintained. Thus, it becomes possible to adaptively output the background level as the white level while restraining the color reproducibility deterioration to a minimum in the regions other than the background.

The present embodiment is characterized by that it corrects the background level ($R_W$, $G_W$, $B_W$) calculated at step S103 using the density of the rear side image, and calculates the offset values using the corrected background level ($R_W'$, $G_W'$, $B_W'$) (second background level). Here, the term "offset values" refer to $f_R$ (R, G, B), $f_G$ (R, G, B) and $f_B$ (R, G, B). The values of the background level ($R_W$, $G_W$, $B_W$) on the front side in Expression 1 of FIG. 9 are uniquely obtained as constants for each document from the histograms. Then, as to the values of ($R_W$, $G_W$, $B_W$), fine adjustment is carried out pixel by pixel using the amount of offset of the background (g(x, y)) calculated at step S107. This g(x, y) becomes an adjusted amount that varies in accordance with the input coordinate position (x, y).

When the density of the rear side image is great, the CPU makes a decision that the showthrough has a large effect, and sets the g(x, y) at a small or minus value. On the contrary, when the density of the rear side image is low, the CPU sets the g (x, y) at a large value (see Expression 2 of FIG. 9).

At step S108, applying such nonlinear conversion as that of Expression 1 of FIG. 9 to the background level (second background level) passing through the fine adjustment makes it possible to carry out the background removal weighted on regions with a lot of showthrough (which corresponds to swinging the background level determined in FIG. 4 to right and left with respect to the offset).

Using the formulae makes it possible to carry out the background removal processing with a rather simple circuit without using complicated processing as compared with the showthrough removal using straightforward computation processing of the front side image and the rear side image.

Figure 5:
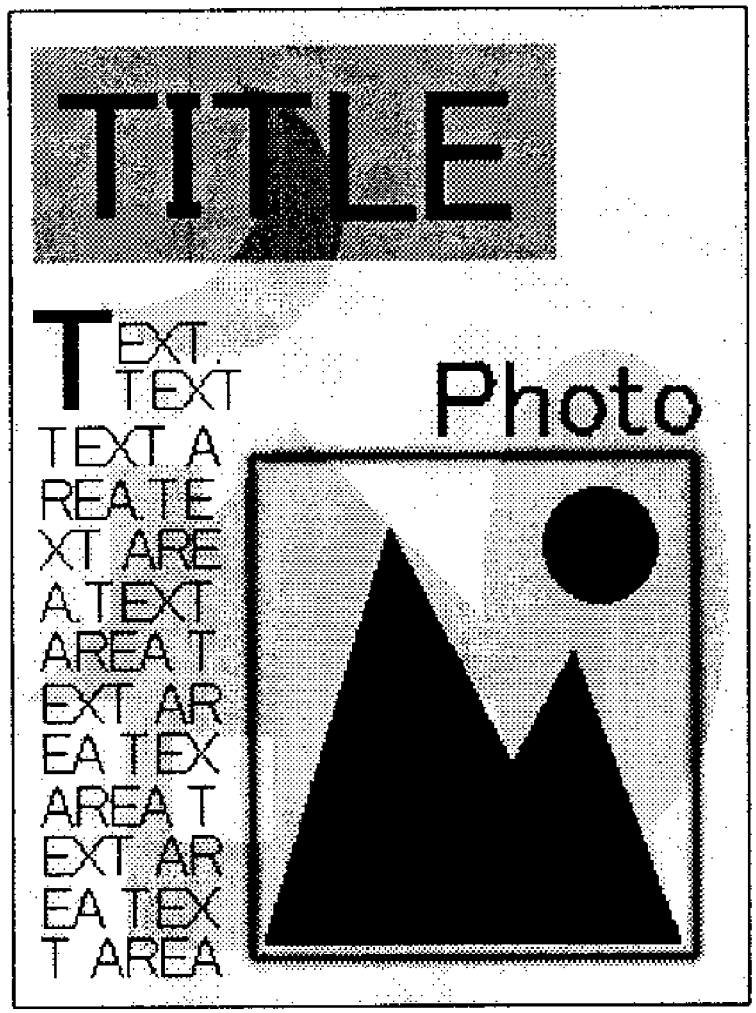
FIG. 5 is a drawing showing an image according to the processing flow of the present embodiment.
Figure 6:
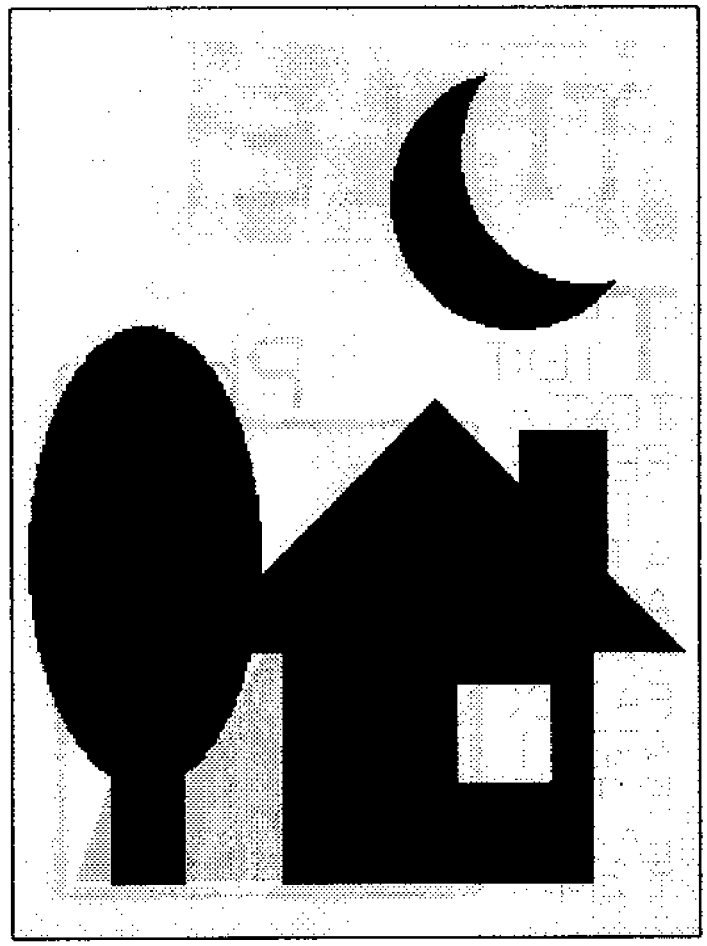
FIG. 6 is a drawing showing an image according to the processing flow of the present embodiment.
Figure 7:
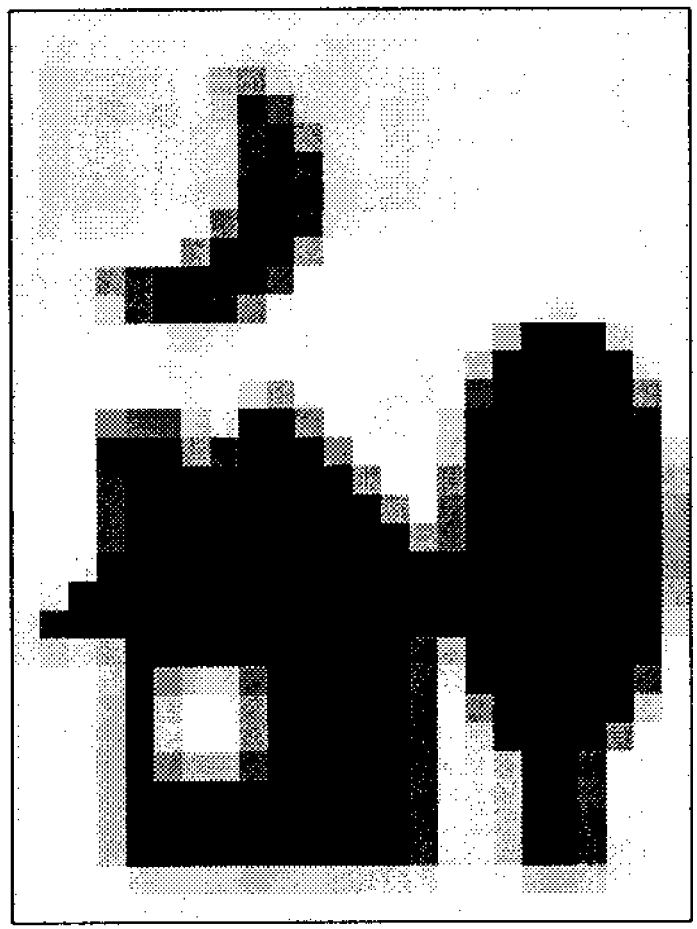
FIG. 7 is a drawing showing an image according to the processing flow of the present embodiment.
Figure 8:
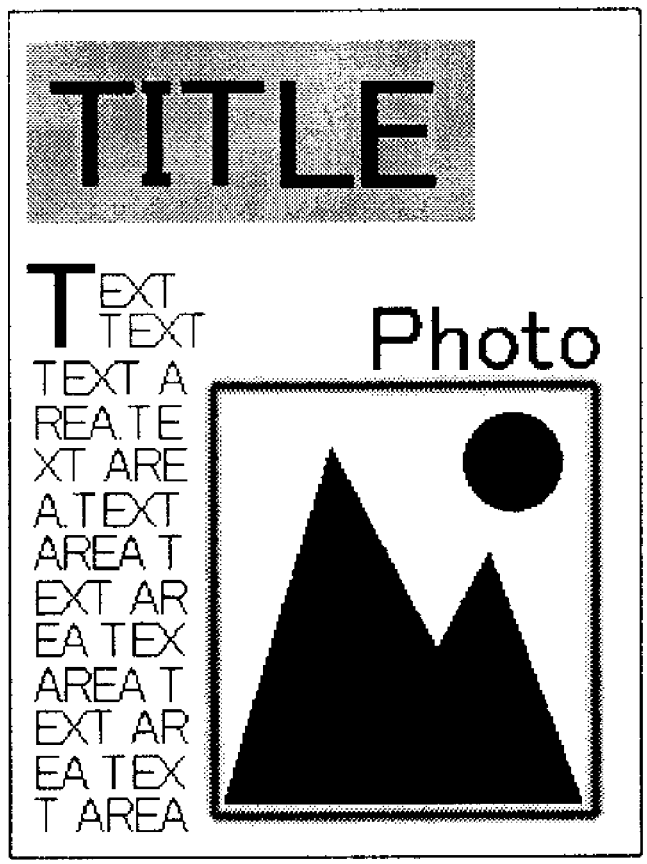
FIG. 8 is a drawing showing an image according to the processing flow of the present embodiment.

FIGS. 5-8 show images during the processing. The image in FIG. 5 shows a front side input image. It shows a manner in which the background covers the showthrough and a rear side image is seen through. Likewise, FIG. 6 shows an input image of the rear side image in which the front side image is seen through contrariwise. FIG. 7 shows an image obtained by passing the rear side image through the resolution conversion and mirror image inversion. Using the image shown in FIG. 7 for the background level offset makes it possible to obtain the output as shown in FIG. 8 in the end.

Carrying out the background removal processing considering the density of the rear side image in this way makes it possible to perform the pixel offset in accordance with the input pixel values even in the case where the rear side image has a low resolution against the front side, thereby being able to perform good show through and background removal.

Although the present embodiment is described by way of example that reads both the front side image and rear side image at once, the front side image and the rear side image can also be read independently.

In addition, although the foregoing embodiment obtains the background level from the histograms, it can also retain it within the apparatus as a default value and skip the processing of obtaining it from the histograms. In this case, the image prescanning for determining the background level becomes unnecessary.

Besides, the relationships between the front side image and the rear side image can be converse. More specifically, assuming that the rear side image of the document is on the front side of the document, the front side image that appears inadvertently in the rear side image can be removed. Thus, in the example shown in FIGS. 5-8, processing that reverses the relationships between the image shown in FIG. 5 and the image shown in FIG. 6 enables the removal of the image components which are shown in FIG. 5 and appear unexpectedly in the image shown in FIG. 6.

Although the present embodiment uses Expressions shown in FIG. 9 as the background removal formulae, the background removal formulae are not limited to them.

As described above, the embodiment 1 can remove the show through, in which the rear side image appears unexpectedly in the front side image, by carrying out the background removal processing of the front side image considering the density of the rear side image.

Embodiment 2

In the foregoing first embodiment, the showthrough correction values g(x, y) in the nonlinear background removal formulae are dynamically varied for respective pixels. Thus, the formulae vary for respective pixels by considering the rear side image because the values $R_W$, $G_W$, and $B_W$ are constant. More specifically, as for the divisor in Expression 1 shown in FIG. 9, when the background level is uniform within the image, it can be calculated in advance because the coefficients become constant. In contrast with this, when the components of the g(x, y) are made offset, recalculation becomes necessary for respective pixels.

In view of this, concerning the coefficients that require recalculation, a plurality of their candidates can be prepared in advance so that they are switched in accordance with the offset of the background level of the rear side image.

For example, eight sets of (Rcoef(n), Gcoef(n), Bcoef(n)), where n=0–7, are prepared as the candidates of the coefficients shown in Expression 3 of FIG. 9 in accordance with the offset of the background level of the rear side image. The coefficients are calculated from the background level $R_W$, $G_W$, $B_W$, which are obtained from the front side image, and from the levels obtained in advance by restricting the levels that appear by thinning out the background offset values of the rear side image (see Expression 3 of FIG. 9)

Switching between the eight sets of the coefficients in accordance with the offset values of the background level of the rear side image enables the reduction in the calculation processing.

Although the steps of the offset of the background level become rough, it is enough for HW (user interface) circuit to prepare only a selector, which makes it possible to reduce the number of times of the division by given numbers for the respective pixels.

Embodiment 3

Although the first and second embodiments are described in the assumption that the degree of transparency of the rear side image is uniform regardless of the type of paper, the degree of transparency of the rear side image to the front side image can be taken into account by providing the reading apparatus with a sensor that can measure the thickness of the paper.

The sensor can be one that senses the thickness of the paper. Alternatively, the sensor can be one that senses the transparency of the paper.

More specifically, in the step of creating the offset of the background level at step S107 of FIG. 1, a decision is made when the paper is thin that the rear side image has a large effect on the front side image. Then, the amount of adjustment of the background level and the fluctuations thereof are increased. In contrast, when the paper is thick, the amount of the adjustment and the fluctuations thereof are reduced.

This makes it possible to realize the showthrough removal considering the thickness of paper, thereby being able to improve the calculation accuracy.

Embodiment 4

Although the foregoing third embodiment is described that it has a device for sensing the thickness of paper, it is also possible for a user to designate the degree of the transmission of the rear side image to the front side image through UI (user interface).

The user sets a set point for designating the degree of thickness or the degree of transmission of the document he or she wishes to have read through the user interface so that the set point is taken into account at the step of creating the offset of the background level at the foregoing step S107.

In addition, as for the background level of the front side image, it is also possible to install a user interface that enables a user to designate it. In this case, instead of obtaining the background level from the histogram at step S103, the background level designated through the user interface is used.

In this way, the showthrough preventing processing the user intends becomes possible without installing a device for sensing the thickness of paper.

[Other Embodiments]

The present invention is further applicable not only to a system consisting of a plurality of devices (such as a computer, an interface unit, a reader and a printer), but also to an apparatus consisting of a single device (such as a multifunction machine, a printer or a fax machine).

In addition, the object of the present invention can be achieved by storing into a storage medium a program code for implementing the procedures of the flowchart shown in the embodiment described above, and by reading and executing the program code with a computer (or CPU or MPU) of the system or apparatus. In this case, the program code itself read from the storage medium implements the functions of the foregoing embodiments. Accordingly, the program code or a computer readable storage medium that stores/records the program code constitutes the present invention as well.

As the storage medium for supplying the program code, a floppy (registered trademark) disk, hard disk, optical disk, magneto-optical disk, CD-ROM, CD-R, magnetic tape, nonvolatile memory card, ROM and the like can be used.

Besides, the functions of the foregoing embodiments are implemented by executing the read-out program with the computer. In addition, the term "execution of the program" includes the case where an OS and the like working on the computer perform part or all of the actual processing according to the instructions of the program.

Furthermore, the functions of the foregoing embodiments can also be implemented by a function expansion board inserted into a computer or a function expansion unit connected to the computer. In this case, the program read out of the storage medium is written into a memory in the expansion board inserted to the computer or into a memory in the expansion unit connected to the computer. After that, according to the instructions of the program, the CPU in the expansion board or in the expansion unit executes part or all of the actual processing. Such processing by the function expansion board or function expansion unit can also implement the functions of the foregoing embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-329341, filed Dec. 20, 2007, which is hereby incorporated by reference herein in its entirety.

What is claimed is:

1. An image processing apparatus comprising:
a front reading unit constructed to read image information on a front side of a document;
a rear reading unit constructed to read image information on a rear side of the document;
a resolution conversion unit constructed to convert the resolution of the image information on the rear side of the document read by the rear reading unit into a lower resolution;
a first computing unit constructed to calculate a first background level uniquely obtained for the document from the image information on the front side read out by the front reading unit;
a second computing unit constructed to calculate a second background level by adjusting the first background level for respective pixels of image information on the front side according to the image information on the rear side converted by the resolution conversion unit; and
a background removal unit constructed to remove background on the front side of the document by using the second background level calculated by the second computing unit.

2. The image processing apparatus as claimed in claim 1, wherein the second computing unit modifies the second background level to a smaller value as the density of the image information on the rear side increases.

3. The image processing apparatus as claimed in claim 1, wherein the resolution of the image information on the rear side converted by the resolution conversion unit is lower than resolution of the image information on the front side.

4. The image processing apparatus as claimed in claim 1, wherein the first background level calculated by the first computing unit is calculated using histograms created from the image information on the front side.

5. The image processing apparatus as claimed in claim 1, further comprising an acquiring unit constructed to acquire a thickness of the document, wherein an adjustment amount of the first background level is modified in accordance with the thickness of the document.

6. The image processing apparatus as claimed in claim 1, further comprising an acquiring unit constructed to acquire a degree of transparency of the document, wherein an adjustment amount of the first background level is modified in accordance with the degree of transparency of the document.

7. The image processing apparatus as claimed in claim 1, further comprising a specifying unit constructed to specify a set point of transparency of the document, wherein an adjustment amount of the first background level is modified in accordance with the set point.

8. An image processing method comprising:
a front side reading step of reading image information on the front side of a document;
a rear side reading step of reading image information on the rear side of the document;
a resolution conversion step of converting the resolution of the image information on the rear side of the document read by the rear reading unit into a lower resolution;
a first computing step of calculating a first background level uniquely obtained for the document from the image information on the front side read out in the front side reading step;
a second computing step of calculating a second background level by adjusting the first background level for respective pixels of image information on the front side according to the image information on the rear side converted by the resolution conversion step; and
a background removal step of removing background on the front side of the document by using the second background level calculated in the second computing step.

9. A computer program stored in a non-transitory computer-readable storage medium to cause a computer to execute an image processing method of an image processing apparatus, the method comprising:
a front side reading step of reading image information on the front side of a document;
a rear side reading step of reading image information on the rear side of the document;
a resolution conversion step of converting the resolution of the image information on the rear side of the document read by the rear reading unit into a lower resolution;
a first computing step of calculating a first background level uniquely obtained for the document from the image information on the front side read out in the front side reading step;
a second computing step of calculating a second background level by adjusting the first background level for respective pixels of image information on the front side according to the image information on the rear side converted by the resolution conversion step; and
a background removal step of removing background on the front side of the document by using the second background level calculated in the second computing step.

* * * * *